United States Patent [19]

Beard et al.

[11] 4,328,887
[45] May 11, 1982

[54] UNSCRAMBLER-UNLOADER

[75] Inventors: James D. Beard, Overland Park, Kans.; Donald J. Nelson, Kansas City; Kirk J. Haller, Raytown, both of Mo.; Kenneth E. Bowers, Prairie Village, Kans.

[73] Assignee: Ethyl Development Corporation, Richmond, Va.

[21] Appl. No.: 137,566

[22] Filed: Apr. 7, 1980

[51] Int. Cl.³ .............................................. B65G 47/14
[52] U.S. Cl. ..................................... 198/396; 198/399; 198/492
[58] Field of Search ............... 198/382, 396, 399, 425, 198/433, 445, 446, 447, 492

[56] References Cited

U.S. PATENT DOCUMENTS

| | | | |
|---|---|---|---|
| 2,813,615 | 11/1957 | Klein | 198/492 |
| 3,365,047 | 1/1968 | Schmitz | 198/396 |
| 3,710,918 | 1/1973 | Babunovic | 198/445 |
| 3,776,346 | 12/1973 | Dubuit | 198/396 |
| 3,868,012 | 2/1975 | Kinsley | 198/396 |
| 4,029,195 | 6/1977 | Hartness et al. | 198/445 |

FOREIGN PATENT DOCUMENTS

| | | | |
|---|---|---|---|
| 940547 | 1/1974 | Canada | 198/396 |
| 739685 | 11/1955 | United Kingdom | 198/382 |
| 265704 | 6/1970 | U.S.S.R. | 198/382 |

*Primary Examiner*—Joseph E. Valenza
*Attorney, Agent, or Firm*—Donald L. Johnson; John F. Sieberth; Edgar E. Spielman

[57] ABSTRACT

This invention relates to a multistation apparatus for unloading and unscrambling containers from a storage hopper. The apparatus has unloading means for continuously moving containers from the hopper onto a track structure. The track structure is powered so as to move the containers to the various apparatus stations. At the first station a gate is positioned over the track so that only one layer of unloaded containers is able to travel to other subsequent stations. A second station is provided with orientation plates adjacent the track so that containers which are on the track but which do not have their long axis in the direction of container travel will, upon contact with the orientation plates, be turned so that their long axis will lay in the direction of travel. A gate having an opened and closed position is provided at the third station. This third station gate will strike containers which are hooked together at their necks or which are stacked one on top of the other to effect separation between the containers. Further down the track, a fourth station is provided having a gate which opens and closes to intermittently halt the travel of containers at that station. A fifth station is utilized to flip over containers which are traveling with their bottoms facing in a direction opposite the direction of travel. By having their bottoms facing in the direction of travel, the containers, as they fall from the fifth station onto an optional conveyor belt, will land in an upright stable position so that the conveyor belt can carry them onto subsequent decorating apparatuses or to loading stations.

23 Claims, 15 Drawing Figures

UNSCRAMBLER-UNLOADER

BACKGROUND OF THE INVENTION

The production of hollow plastic containers is almost universally carried out on split blow mold machines. Such machines are capable of high capacity output, indeed, in some cases as many as 1600 bottles/hour can be produced. Collecting the containers as they are produced is usually achieved by channeling the containers to a large storage hopper. Storage in the hopper is without regard to orientation of the containers. Since the containers must be packaged in boxes for shipment, it is highly desirable that their removal from the hopper be achieved in a manner resulting in uniform container orientation. With the containers uniformly oriented, the use of automatic loading equipment is possible. Even if the packaging is done by hand, orientation of the containers aids in reducing packaging time. Also, in some cases, it is desirable to decorate the containers prior to their shipment and thus proper orientation is necessary for the acceptance of the containers by the decoration equipment.

Presently, there are various unscrambler-unloader devices on the market which have enjoyed some success in orienting containers as they are unloaded from the storage hopper. However, these devices suffer two major drawbacks, that is they have a low unloading-orienting rate and they tend to scuff the containers making them unsuitable for high quality decorations. The scuffing is generally attributed to the fact that small capacity hoppers must be utilized with these devices and to the fact that cleated belts are utilized in achieving the orienting-unloading steps.

It is therefore an object of this invention to provide an unscrambler-unloader which is capable of a high rate of output but which, at the same time, is almost completely benign to the containers passed through the device. It is also an object of this invention to achieve the aforementioned object with a very quiet and simple unit.

THE INVENTION

This invention relates to a multistation apparatus for unloading and unscrambling containers from a storage hopper. The apparatus has unloading means for continuously moving containers from the hopper onto a track structure. The track structure is powered so as to move the containers to the various apparatus stations. At the first station a gate is positioned over the track so that only one layer of unloaded containers is able to travel to other subsequent stations. A second station is provided with orientation plates adjacent the track so that containers which are on the track but which do not have their long axis in the direction of container travel will, upon contact with the orientation plates, be turned so that their long axis will lay in the direction of travel. A gate having an opened and closed position is provided at the third station. In the closed position containers at this third station will be intermittently halted. In the opened position the containers are allowed to move on to subsequent stations. This third station gate is positioned above the track so that, as the gate moves from the opened position to the closed position, it will strike containers which are hooked together at their necks or which are stacked one on top of the other to effect separation between the containers. Further down the track a fourth station is provided having a gate which opens and closes to intermittently halt the travel of containers at that station. A fifth station is utilized to flip over containers which are traveling with their bottoms facing in a direction opposite the direction of travel. By having their bottoms facing in the direction of travel, the containers, as they fall from the fifth station onto an optional conveyor belt, will land in an upright stable position so that the conveyor belt can carry them onto subsequent decorating apparatuses or to loading stations.

Preferably, the track should provide a scalloped path which is powered by a series of vibrating tables. The scalloped path will allow the containers to movably nest therein and thus prevent any unwanted straying from the track path. Adjacent to the fifth station, the track preferably changes to a conveyor belt with a high friction surface. This conveyor belt aids in the flip over, at the fifth station, as hereinafter described.

Since the apparatus of this invention utilizes vibration to power the track along with a short run of conveyor belt, delicate handling of the containers is made possible. Also, since the various orienting, intermittent stopping and flip-over steps performed on the containers require only light touching of the container there is little reason for scuffing or damage thereto.

These and other features of the apparatus of this invention contributing to satisfaction in use and economy in manufacture will be more fully understood from the following description and drawings in which identical numbers refer to identical parts and in which:

FIG. 10A is a perspective view of a flip-over yoke;

Figure 1:
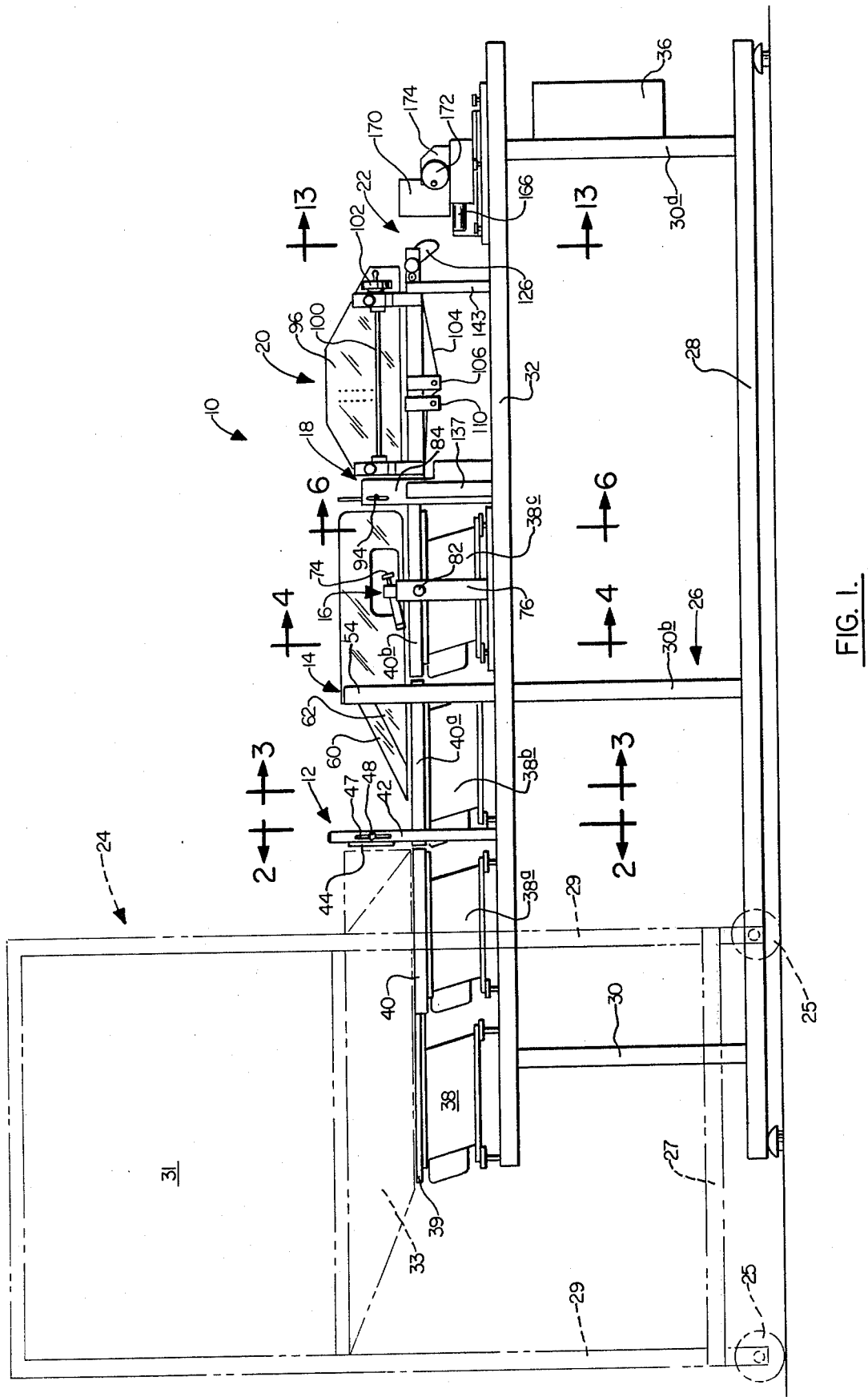
FIG. 1 is a side elevational view of an apparatus of this invention.

Referring now to FIG. 1, there is seen an unscrambler-unloader apparatus of this invention, generally designated by the numeral 10, with a storage hopper, generally designated by the numeral 24, in position for unloading containers onto apparatus 10. Hopper 24 has a cubical storage bed 31 which is supported by four vertical support beams 29 (two of the beams are not shown in FIG. 1, it being understood that they are identical and opposite the beams 29). Hopper wheels 25 are provided at the lower extent of beams 29 so that hopper 24 may be rolled to the container manufacturing apparatus for collection of containers and then to apparatus 10 for the unscrambling-unloading function. Immediately beneath and connected to cubicle 31 there is provided hopper funnel 33 which directs the containers as they are unloaded from hopper 24 onto apparatus 10. When hopper 24 is being filled with containers, hopper funnel 33 is closed off by a sliding door, not shown. When hopper 24 is positioned for unloading onto apparatus 10 for the unscrambling-unloading function the sliding door is removed so that the containers can be fed to apparatus 10.

Apparatus 10 is supported by a table generally designated by the numeral 26. Table 26 has a floor plate 28 which is mounted in a level attitude on a building floor. Upwardly extending from floor plate 28 are six vertical frame members 30, 30a, 30b, 30c, 30d and 30e, as can be seen in FIGS. 1-4. These vertical frame members support, at their uppermost ends, table top 32. As can be appreciated by those skilled in the art, the components of table 26 are of a size and material, e.g. steel, to assure sufficient strength to maintain a rigid table during operation of the unscrambling-unloading function.

As mentioned previously, apparatus 10 utilizes a track structure to move the containers from hopper 24 to final disposition. In apparatus 10 the track structure has a series of vibrating scalloped tracks 40, 40a and 40b which are shown in FIGS. 1-6. As can be seen in FIG. 1, the scalloped tracks are abutted end to end. The individual track scallops are aligned so as to provide a continuous channel. The advantage of having a continuous channel can be appreciated by viewing FIGS. 2, 3 and 4 wherein it is shown that the containers will be maintained in a straight line of travel as the scallops, which form the channels, prevent the containers from moving transversely across the track. It is also to be understood that other channel designs can be utilized to achieve this cradling of the container as it moves along the track structure. The particular design can be tailored for the cross-sectional shape of the container which best accomplishes the aforementioned function. Abutting the downstreammost point of scalloped track 40b is the last portion of the track structure, i.e. conveyor belt 104. Conveyor belt 104 is utilized to facilitate the flip-over operation performed by flip-over station 20, as hereinafter described.

Preceding the track structure there is provided a rubberized vibrating table 39 which will make first contact with the containers from hopper 24 as they are directed downward onto table 39 by hopper funnel 33.

To provide the necessary vibrating motion required by the track structure and by rubberized table 39, there is provided electrically powered vibrators. As can be seen in FIGS. 1-4, electrical vibrator 33 is utilized to power rubberized table 39 while electrical vibrators 38a, 38b and 38c are utilized to power scalloped tracks 40, 40a and 40b, respectively.

To achieve the desired movement of the containers along the track structure, the vibrators are adjusted to vibrate at different amplitudes and for different periods of duration. For example, electrical vibrator 38 is adjusted to have a low amplitude to keep the containers in the hopper area from jamming by bridging and thereby blocking the flow of containers onto the track structure. Vibrator 38 is kept activated at all times during unloading of the hoppers. Electrical vibrator 38a, on the other hand, is preferably activated for periods of time dictated by the observed output of apparatus 10. Vibrator 38a is set to move at a high amplitude to achieve the function of allowing only one bottle layer to be advanced through hopper exit throat 12. Electrical vibrator 38b is preferably adjusted to provide continuous vibration at an amplitude to achieve the function of second station 14. Electrical vibrator 38c is adjusted to vibrate continuously at a high amplitude to both advance the containers and to aid in separation of containers which are locked together at their necks. Adjustments to the vibrators is achieved by trial and error and observation, the adjustments being dependent upon the container size, weight, shape, and the flow rate sought.

To insure reliability of container movement the rubberized table and the scalloped tracks have various coatings. Rubberized table 39 preferably has a live rubber surface which surface has been found to give good results in insuring that the containers do not bridge in hopper 24. Preferably, scalloped track 40 also has a rubberized surface to give containers on scalloped track 40 the desired movement as they pass through hopper exit throat 12 which is the first station of apparatus 10. Scalloped tracks 40a and 40b utilize oriented material such as carpet having a pile biased in the direction of container movement. Other materials which are specifically made for moving articles along a path by vibration may be used as long as the material does not damage the containers.

As mentioned previously, the track structure for apparatus 10 ends with a segment of conveyor belt 104. This conveyor belt is preferably made of a material such as rubber which exhibits a high coefficient of friction with the material from which the containers are made.

Figure 2:
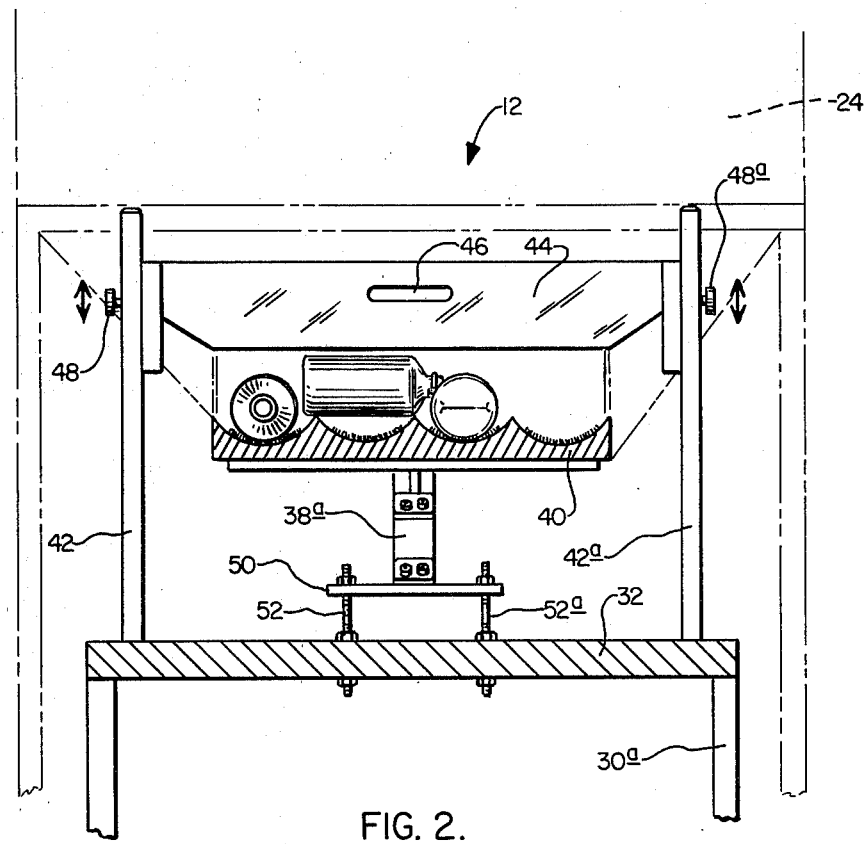
FIG. 2 is a sectional view taken through section line 2—2 in FIG. 1.

After storage hopper 24 has been placed in position and the sliding door has been removed, the containers fall into contact with rubberized table 39. As the containers make contact with scalloped track 40 they are advanced to hopper exit throat 12. The function of exit hopper throat 12 is to insure that only one layer of containers is allowed to pass onto subsequent apparatus stations. This function can be achieved by utilizing gate 44 as shown in FIG. 2. Gate 44 is positioned so that its lowermost extent is at a height above scalloped track 40 whereby containers which are layered on top of containers on scalloped track 40 will come into contact with gate 44. The second layer containers will be prevented from further advancement and will ultimately fall onto track 40 when the containers under them pass under gate 44. Since apparatus 10 may be utilized for unscrambling-unloading various sized containers, gate 44 has vertical adjustment by means of knobs 48 and 48a which are able to maintain the vertical height of gate 44 by means of a friction-fit within vertical adjustment slots provided in gate stands 42 and 42a. These slots are identical and opposite with one of the slots not being shown and the other being shown and numbered 47 in FIG. 1. Hand hold 46 in gate 44 is used to aid in gripping the gate when the height of gate 44 is adjusted. Electrical vibrator 38a is utilized to power scalloped track 40 by giving it vibrating motion and such vibrator is mounted to table top 32 by means of nuts and bolts 52 and 52a which hold vibrator mounting plate 50 to which vibrator 38a is mounted.

Figure 3:
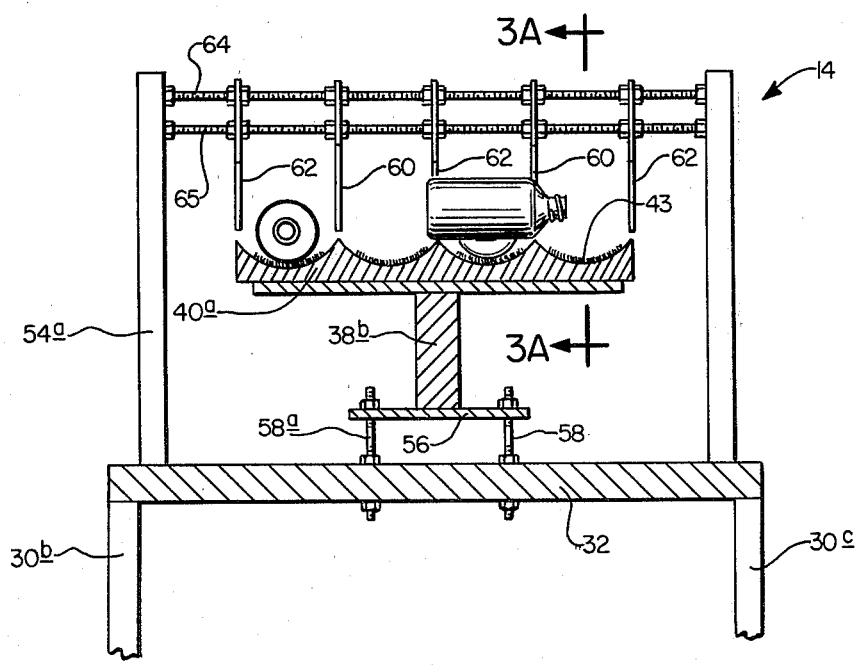
FIG. 3 is a sectional view taken through section line 3—3 in FIG. 1.
Figure 3A:
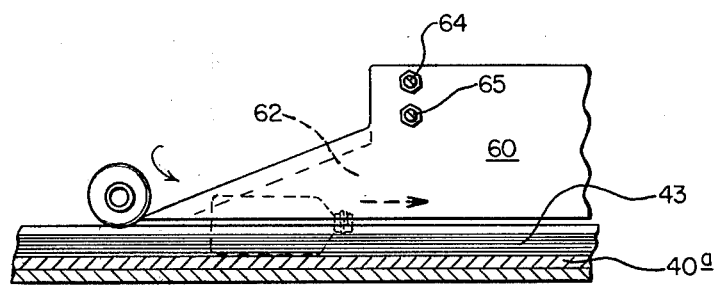
FIG. 3A is a sectional view taken through section line 3A—3A in FIG. 3.

After the containers are passed under gate 44 they approach, in a single layer, a second station, generally designated by the numeral 14, having orientation structure such as is shown in FIGS. 1, 3 and 3A. For the preferred apparatus of this invention this orientation structure comprises a pair of spaced-apart contact plates, one of which is mounted on one side of one of the scallops and the other mounted on the other side of the same scallop. The function of the orientation structure is to orient containers which do not have their long axis in the direction of container travel so that they do have their long axis in the direction of container travel. Preferably this can be achieved by utilizing the motion imparted to the containers by the scalloped tracks found at second station 12. As the misoriented container moves along the scalloped track it will contact the two contact plates as shown in FIG. 3. Since one of the plates extends closer to hopper exit throat 12 than the other, the contact by the container will not be simultaneous with both plates. Since the container hits one plate first, the other end of the container will continue on down scalloped track 40a until it contacts the second plate. This will place the container in an angled attitude which results, due to the continuing vibrating of scalloped track 40a, in the container being turned so that it falls into the scalloped portion of the track with its long axis being oriented in the direction of travel.

In the embodiment shown in FIGS. 1, 3 and 3A, station 12 utilizes an alternating series of triangular contact plates to achieve the above-described function. Small contact plates 62 and large contact plates 60, have their hypotenuse edge facing downwardly and towards hopper exit throat 12. By using this configuration a downwardly sloped contact edge is provided on each of the plates. Also note that the small plates are alternated with the large plates. All plates are mounted to threaded rods 64 and 65 which are rigidly mounted to contact plate stands 54 and 54a. Contact plates 60 and 62 should not be sharp and shall present smooth edges which will not damage the container when the container makes contact with them.

Scalloped track 40a has oriented fiber material 43 on its upper surface. The fibers are oriented in the direction of travel and aid in moving the container with the vibrating action provided by vibrator 38b. Vibrator 38b is mounted to vibrator mounting plate 56 which is held to table top 32 by means of nuts and bolts 58 and 58a.

After leaving second station 12 the container is moved from scalloped track 40a onto scalloped track 40b which latter track is powered by electrically powered vibrator 38c. Contact plates 60 and 62 have extended portions which extend from second station 12 to a point just short of fourth station 18. These extended portions are positioned on each side of the individual scallops to aid in keeping the containers properly oriented with their long axis in the direction of container travel. There is provided in the extended portions openings therein, as can be seen in FIG. 1, so that a third station, generally designated by the numeral 16, may be free to operate without interference from the extended portions.

Figure 4:
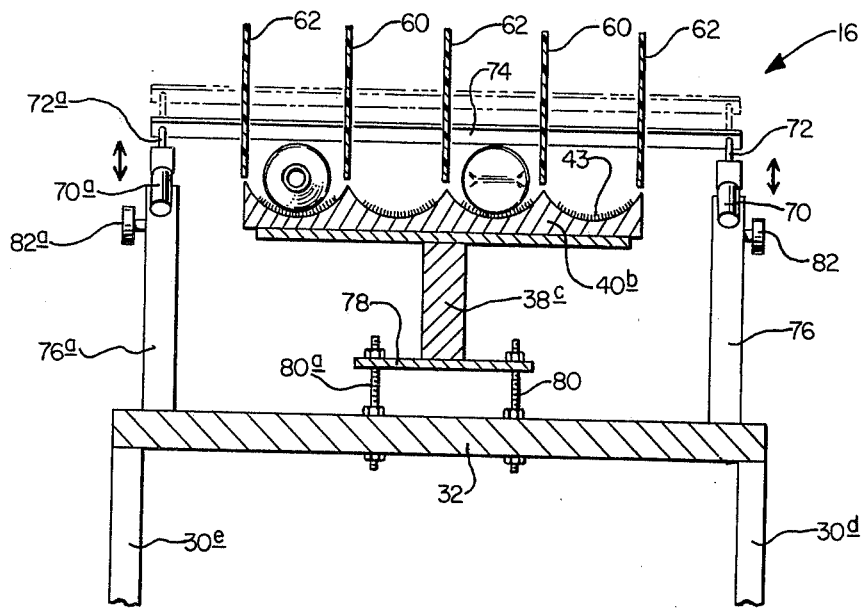
FIG. 4 is a sectional view taken through section line 4—4 in FIG. 1.
Figure 5:
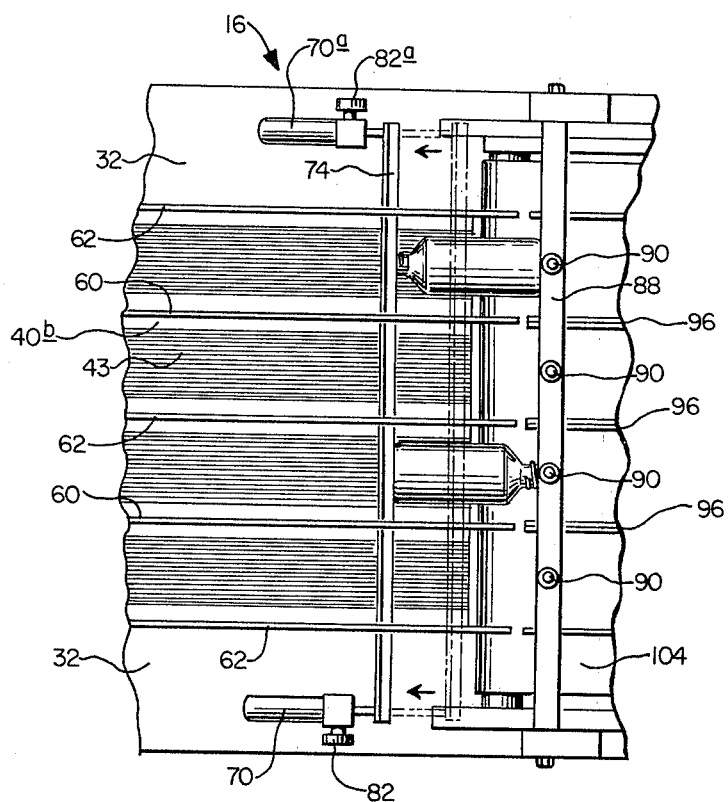
FIG. 5 is a partial top plan view of the third and fourth stations.

In FIGS. 4 and 5 it is seen that third station 16 includes a reciprocating escapement bar 74. Escapement bar 74 has an open and closed position which positions are located along a plane angled downwardly against the direction of container travel. When escapement bar 74 is in the upward position, as shown in phantom lines in FIG. 4, it is at a height which allows for the containers to move unimpeded on to subsequent stations. When escapement bar 74 is in the closed position, also shown in FIG. 4, it is at a height above scalloped track 40b which enables the bar to make contact with the containers and to therefore halt their progress along the track structure. Also by having escapement bar 74 move in a plane angled downwardly opposite the direction of container travel, separation of containers which happen to be hooked together at their necks or which may be stacked one on top of the other is achieved as the bar, in moving downwardly to the closed position, will knock the highest container from the container on scalloped track 40b. (See FIG. 7) To achieve the reciprocating movement, escapement bar 74 is powered by air cylinders 70 and 70a which are connected to the bar by way of piston rods 72 and 72a. Cylinders 70 and 70a are connected to stand arms which are not shown, but which slidably fit within stands 76 and 76a, respectively. By loosening vertical adjustment knobs 82 and 82a which are threaded into stands 76 and 76a the height of escapement bar 74 can be adjusted to accommodate containers of varying heights. Once a height has been determined so that escapement bar 74 makes contact with the containers in the closed position then vertical adjustment knobs 82 and 82a are tightened against the stand arms. Stands 76 and 76a are rigidly mounted to table top 32. Vibrator 38c vibrates scalloped track 40b and is carried by vibrator mounting plate 78 which in turn is bolted by way of nuts and bolts 80 and 80a to table top 32. The same biased fiber material 43 is provided for scalloped track 40b as was provided for scalloped track 40a.

Figure 6:
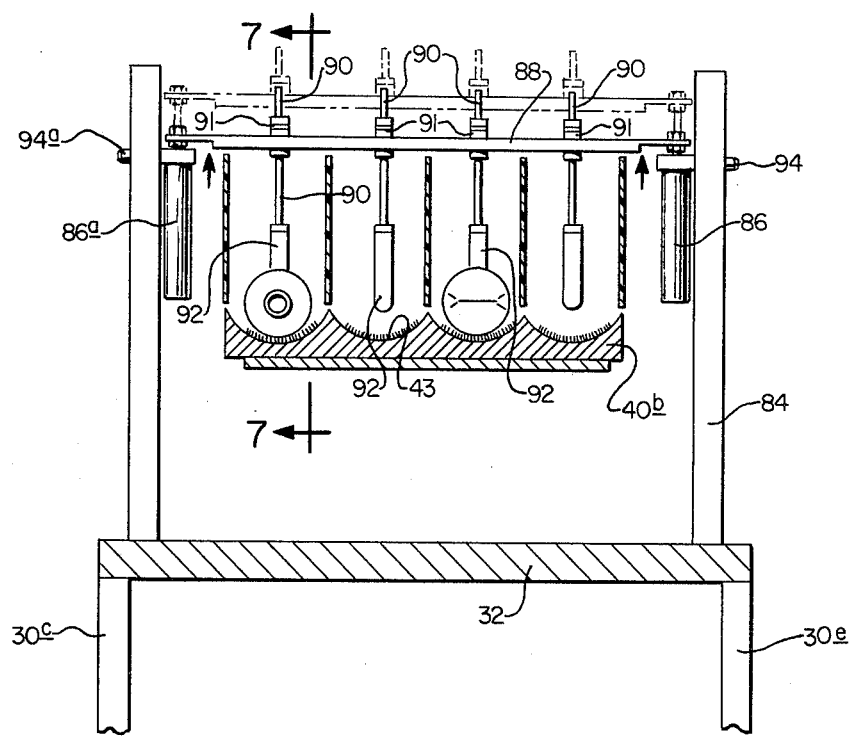
FIG. 6 is a sectional view taken through section line 6—6 in FIG. 1.
Figure 7:
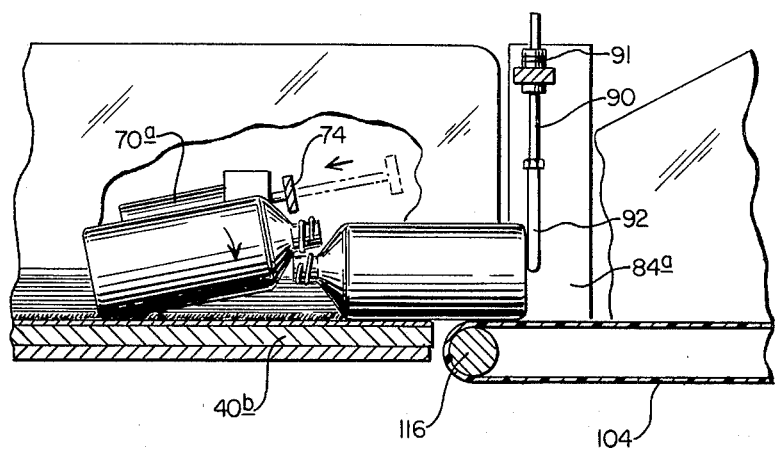
FIG. 7 is a sectional view taken through section line 7—7 in FIG. 6 illustrating the separating of containers hooked together at their necks at the third station.

Immediately downstream from third station 16 is a fourth station, generally designated by the numeral 18. As is seen in FIG. 5, fourth station 18 is positioned slightly more than one container length downstream from third station 16. Like third station 16, fourth station 18 has an open and closed position. FIGS. 6 and 7 show fourth station 18 in the closed mode in which fingers 92 block the continued travel of the container along the scalloped tracks. The open position is shown in phantom lines in FIG. 6. The purpose of fourth station 18 is to insure that containers moving from fourth station 18 towards flip-over station 20 will be moving on line, one bottle per track, so that they will pass through flip-over station 20 at the same time. Such contemperaneous movement is important due to the action of removal station 22 as hereinabove described.

Since fourth station 18 is close to third station 16 it is desirable that the third and fourth stations be alternated between their respective open and closed positions. In other words, third station 16 will be in the closed position when fourth station 18 is in the open position and vice versa.

Referring now to FIGS. 5-7 which show a preferred fourth station of this invention, it can be seen that fourth station 18 utilizes fingers 92 to block the travel of the containers as they move on scalloped track 40b. Note in FIG. 7 that fourth station 18 is actually positioned over conveyor belt 104. Thus a container blocked by fingers 92 will partly be on conveyor belt 104 and on scalloped track 40b. Fingers 92 are connected by means of finger rods 90 which are rigidly mounted in bar 88 by means of set collars 91. Providing the vertical up and down motion necessary for fingers 92 to achieve their open and closed position there is utilized air cylinders 86 and 86a. Air cylinders 86 and 86a are rigidly mounted on stands 84 and 84a by means of adjustment bolts 94 and 94a which are tightened to attain a friction grip within slots in stands 84 and 84a which slots are seen in FIG. 1 but are not numbered. Stands 84 and 84a are rigidly attached to table top 32.

Once a line of containers has been released from fourth station 18 conveyor belt 104 carries the containers to a flip-over station, generally designated by the numeral 20. The purpose of flip-over station 20 is to provide a means for insuring that all the containers leaving that station are leaving it in a bottom first position. This is important as it will be desired to have the containers fall onto a second conveyor belt so that they may be removed from apparatus 10 in an upright stable position.

Figure 8:
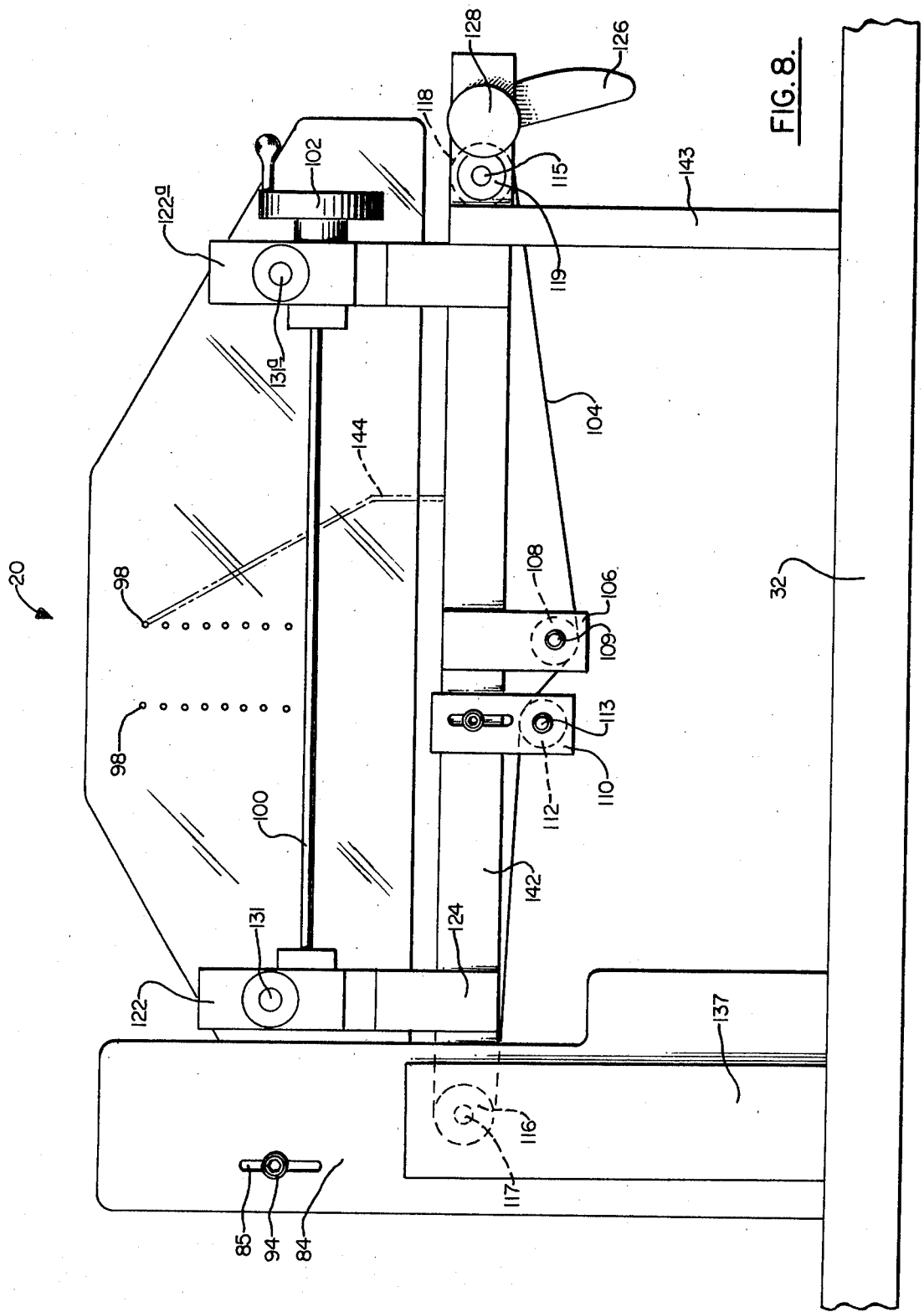
FIG. 8 is a partial side elevational view of the apparatus shown in FIG. 1 showing the fifth station.
Figure 9:
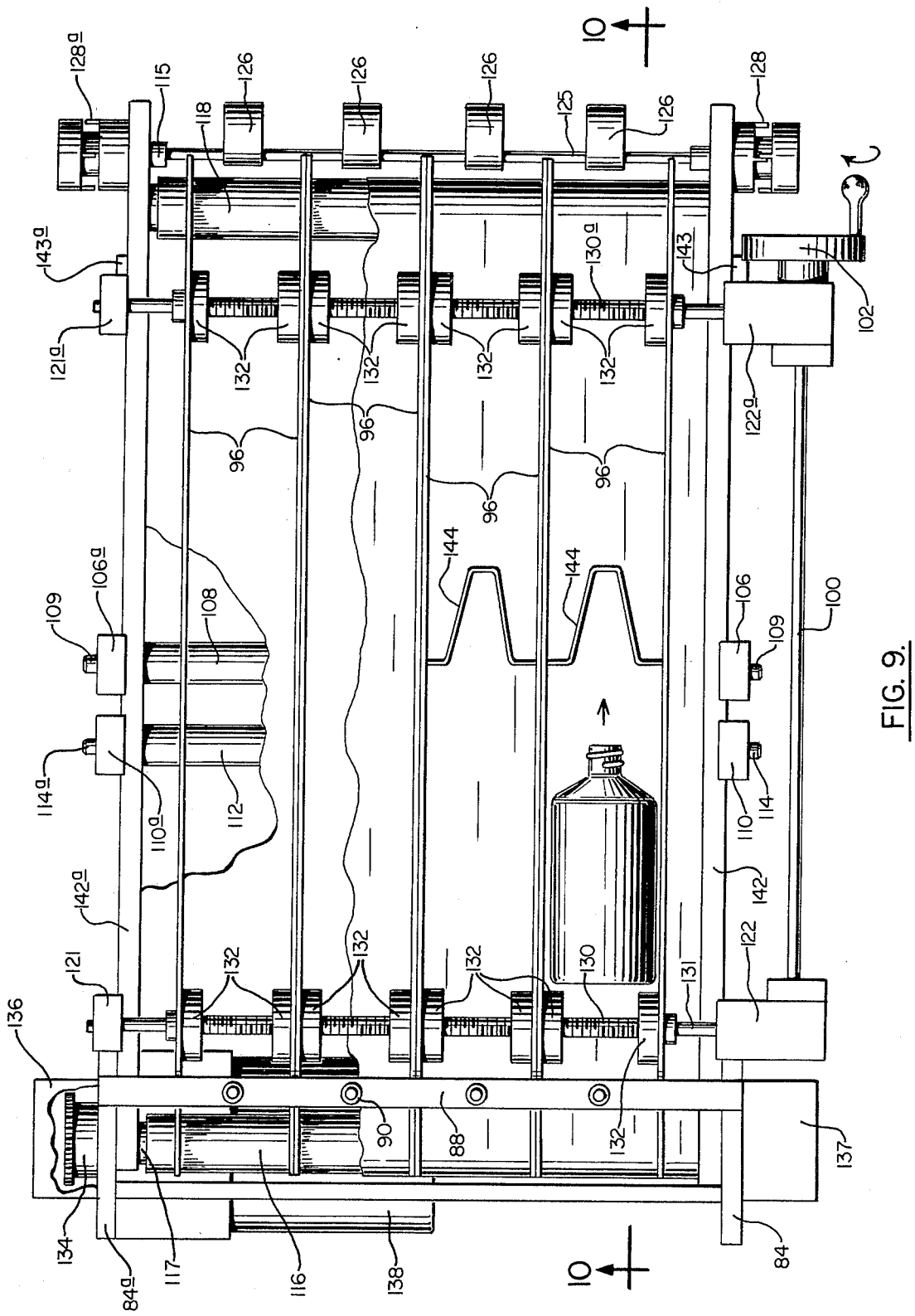
FIG. 9 is a partially broken-away top plan view of the fifth station shown in FIG. 1.
Figure 10:
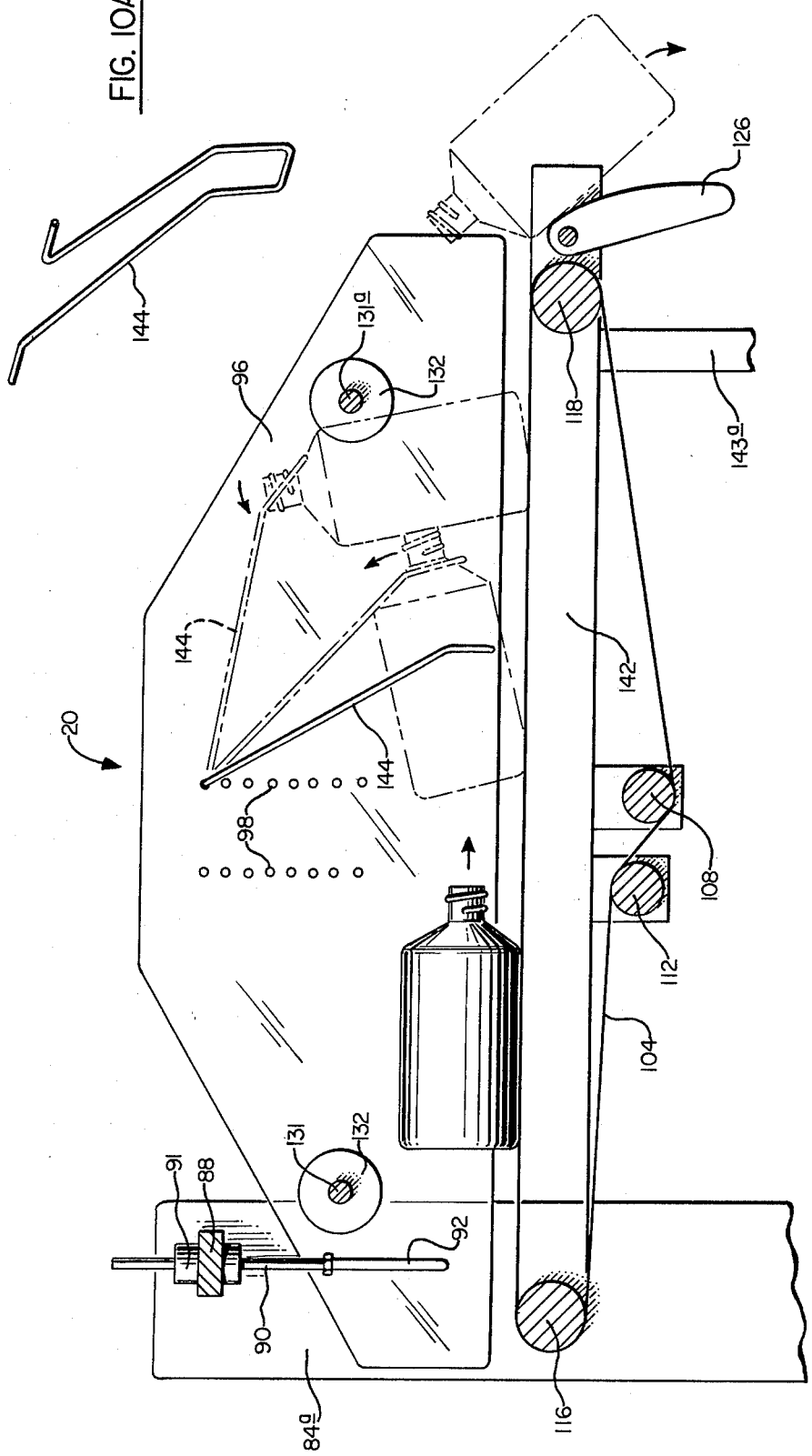
FIG. 10 is a sectional view taken through section line 10—10 in FIG. 9.

A preferred flip-over station utilized as a part of apparatus 10 is shown in FIGS. 8–10. Supporting the flip-over station on table top 32 are stands 84 and 84a on one end and vertical legs 143 and 143a on the other end. To complete the support structure there is provided horizontal beams 142 and 142a which connect stands 84 and 84a to vertical legs 143 and 143a, respectively, as seen in FIGS. 8 and 9. Conveyor belt 104 preferably has a rubberized surface to achieve a high coefficient of friction between itself and the containers. Conveyor belt 104 runs a course around belt drive roller 116, belt roller 118, idle roller 108 and tension roller 112. Belt drive roller 116 is in a drive relationship with sprocket 134 which is attached to belt drive roller shaft 117 which passes through horizontal beam 142a and stand 84a. A bearing is provided to support belt drive roller shaft 117 at both of its ends, the bearing not being shown in the drawings but being mounted in stands 84 and 84a or in horizontal beams 142 and 142a as desired. Housing 137 encloses shaft 117 at its point of mounting to stand 84. Sprocket 134 is in drive relationship with electric motor 138 and is enclosed by sprocket housing 136. At the other end of flip-over station 20 belt roller 118 is provided which roller defines the horizontal extent of conveyor belt 104. Belt roller 118 is carried by belt roller shaft 115 which in turn is mounted in belt roller bearing 119 as shown in FIG. 8, and in another bearing which is not shown in the drawings but which carries the opposite end of shaft 115. The bearings are conveniently mounted within horizontal beams 142 and 142a. To achieve the desired belt tension there is provided idle roller 108 and tension roller 112. Idle roller 108 is mounted to idle roller shaft 109 which is carried by bearings which are not shown but which are mounted in idle roller brackets 106 and 106a. Tension pulley brackets 110 and 110a have bearings mounted therein for receipt of tension roller shaft 113 at its ends. As can be seen in FIG. 8, tension applied to belt 104 is adjustable by raising and lowering tension roller 112. To rigidly hold tension roller 112 at a prescribed height there is provided a slot within tension roller brackets 110 and 110a which allows vertical movement of the bracket and tension for tightening of adjustment bolts 114 and 114a which will maintain the desired tension setting.

Lying in planes essentially parallel to the direction of container travel there is provided a plurality of spaced-apart turn-over divider plates 96. These plates each have multiple mounting holes 98 as can be seen in FIG. 8. Mounting holes 98 are utilized as shown in FIGS. 9 and 10 to rotatably mount flip-over yokes 144. The design of flip-over yokes 144 is dictated by the shape of the container which will engage same. As can be seen in FIG. 10A, yoke 144 has a width at its bottom end large enough to accommodate the neck of the container as it moves along conveyor belt 104. Since the container will have some lattitude in its transverse position as it moves along belt 104, the width at the bottom of yoke 144 must be large enough to accommodate this transverse displacement from the center line. FIG. 10 shows how yoke 144 intercepts the container and holds it by its neck with the bottom of the container continuing down belt 104 so that the container bottom end is placed in the direction of container travel.

To minimize the amount of transverse displacement by containers, turn-over divider plates are placed apart a distance slightly greater than the width of the container as seen in FIG. 9. Therefore divider plates 96 not only serve the function of holding flip-over yokes 144, but also keep the container within a certain desired path. For flip-over station 20, shown in the drawings, the divider plates are given adjustable capabilities so that their distances apart can be changed as the width of the container being fed to apparatus 10 dictates. This adjustment is accomplished by threading flip-over divider plates onto threaded adjustment rods 130 and 130a as seen in FIG. 9. These rods are made up by utilizing hollow threaded sleeves having different thread directions. A sleeve having one thread direction is alternated with a sleeve having an opposite thread direction. The sleeves are pinned to center rods 131 and 131a. Divider plates 96 have rigidly attached thereto threaded collars 132 which are threadable onto the threaded sleeves of rods 130 and 130a. Therefore by turning rods 131 and 131a in a single direction adjacent spaced-apart flip-over divider plates 96 will move towards each other or away from each other depending upon the direction in which rods 131 and 131a are rotated. Rods 131 and 131a are mounted on one of their ends to bearings 121 and 121a, respectively. Rod 131a is in gear drive relationship with hand wheel 102 whereby rotation of the hand wheel also rotates rod 131a. The gears effecting this are conventional and are not shown in the drawings but are housed within gear housing 122a. Also in drive relationship with hand wheel 102 is drive shaft 100 which is in a geared drive relationship with rod 131. Once again the gears are not shown, they being of conventional design and use. The geared arrangement is enclosed within gear housing 122. Thus, with this mechanical arrangement the operator of apparatus 10 need only rotate hand wheel 102 to widen or narrow the distance between divider plates 96 as required by the width of the container passing through flip-over station 20.

After the containers have been turned so that their bottom ends are facing in the direction of container travel, they are allowed to fall off of conveyor belt 104 and onto conveyor belt 166. To aid the containers in attaining an upright and stable position, there is provided, as part of flip-over station 20, a series of stand-up cams 126. There is one stand-up cam for each container path as is seen in FIG. 9. These cams are rigidly mounted to cam rod 125.

Cam rod 125 is mounted in bearings carried by horizontal beams 142 and 142a. To provide spring loading of stand-up cams 126, ends of rod 125 are affixed to outside portions of spring return units 128 and 128a. The inside portions of these spring return units are rigidly fastened to horizontal beams 142 and 142a. Since return units 128 and 128a are spring loaded, depressing of stand-up cams 126 can occur with return to the original position of the cams after the force has been relieved. By having a spring return system, containers which become jammed as they drop on the removal station, hereinafter described, can be easily removed without damage to the equipment or to the container. Also by utilizing a spring return system an electrical switch may be employed which would cut off the flow of containers in case jamming occurs.

Figure 13:
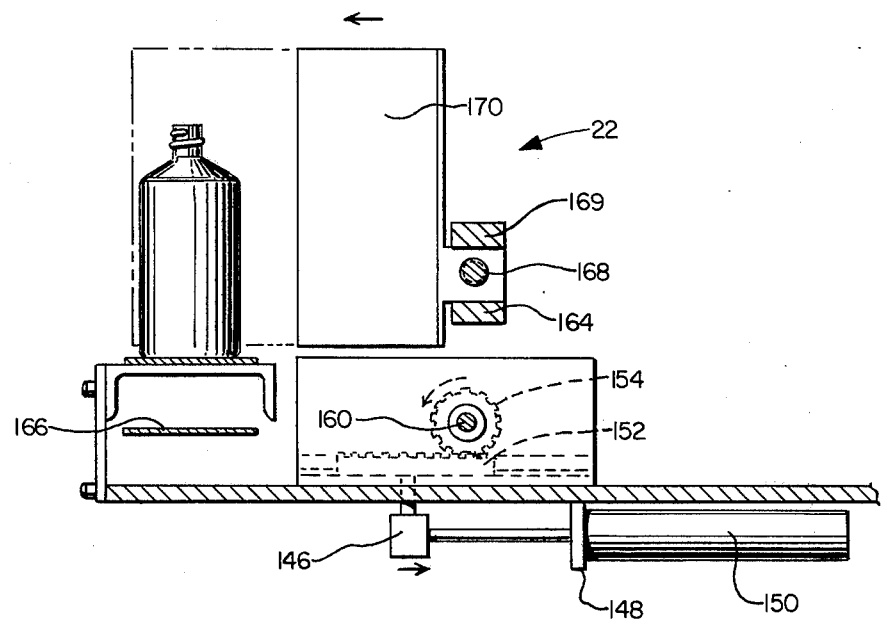
FIG. 13 is a sectional view taken through section line 13—13 of FIG. 12.
Figure 11:
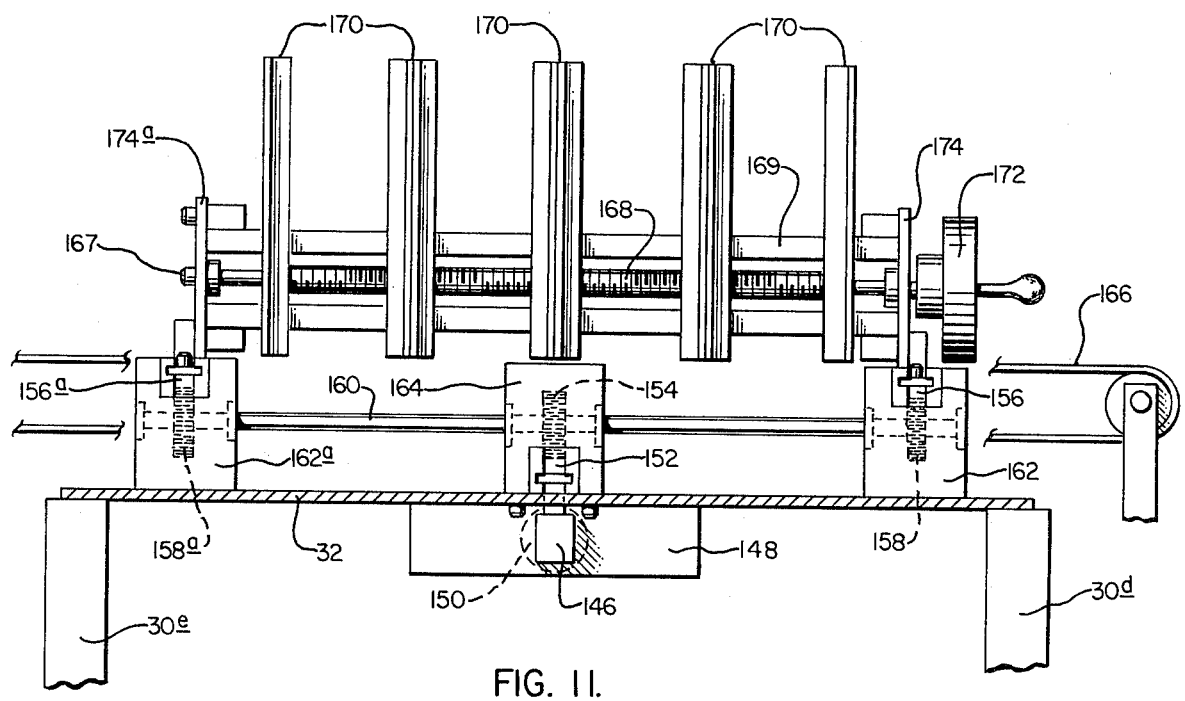
FIG. 11 is a front elevational view of the stabilizing apparatus shown in FIG. 1.
Figure 12:
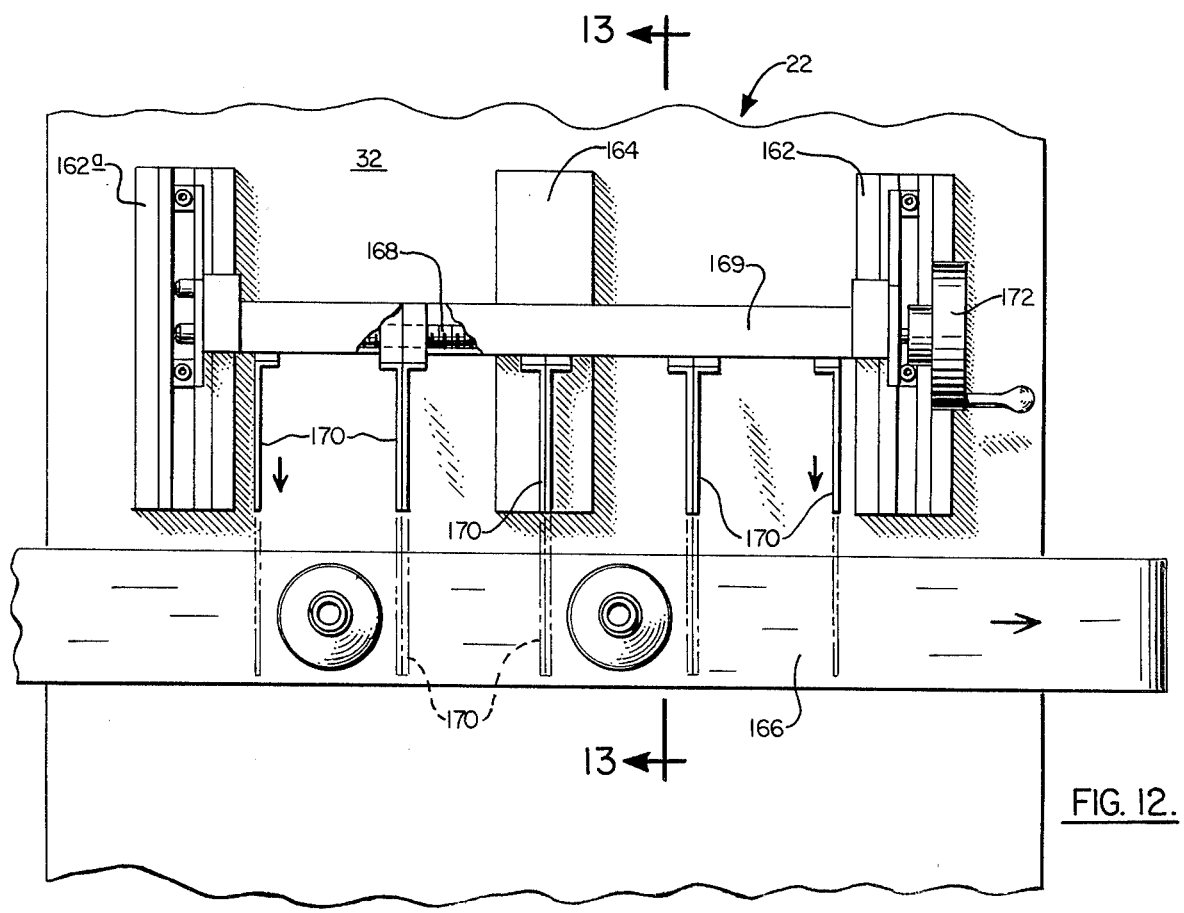
FIG. 12 is a top plan view of the stabilizing apparatus shown in FIG. 1.

A preferred removal station is shown in FIGS. 11–13 and is generally designated by the numeral 22. Removal station 22 is carried by table top 32. Conveyor belt 166 is positioned so that containers falling from flip-over station 20 and deflected by stand-up cams 126 will land thereon in an upright position. Conveyor belt 166 is powered and carries the containers to subsequent decorating stations or to subsequent loading stations where the containers will be placed in boxes for shipment. Dividers 170 are provided to help steady the containers as they fall on conveyor belt 166. The dividers are horizontally movable so that they may assume two positions, one position being over conveyor belt 166 to steady the containers and the other position being away from conveyor belt 166 so that they will not interfere with container movement as the belt carries the containers away. Dividers 170 are mounted on adjusting rod 168 which is shown in FIGS. 11 and 12. Adjustable rod 168 is made up of a center core rod 167 having threaded sleeves secured thereon by means of pins. A sleeve having a thread in one direction abuts a sleeve having a thread in another direction. Dividers 170 are threaded on to these sleeves thus enabling the adjustment of the distance between dividers 170 by turning of hand wheel 172 which is rigidly connected to core rod 167. Housing 169 encases adjusting rod 168 and the threaded portion of dividers 170. Core rod 167 is mounted in bearings carried by adjusting rod brackets 174 and 174a. These brackets are mounted to rack gears 156 and 156a, respectively. Rack gears 156 and 156a mesh with pinion gears 158 and 158a, respectively. Housings 162 and 162a encase the gearing arrangements and are affixed to table 32. To achieve the desired horizontal movement of dividers 170, a pneumatically powered rack and pinion arrangement covered by housing 164 is provided. In FIG. 13 pneumatic cylinder 150 is shown mounted to bracket 148. The rod from cylinder 150 is attached to connecting block 146 which in turn is connected to main rack gear 152 as seen in FIG. 13. Horizontal movement of rack gear 152 results in rotation of main pinion gear 154. Main pinion gear 154 is affixed to axle 160 which in turn is rotatably mounted to housings 162 and 162a. The mountings of axle 160 in these housings is done by means of bearings. Pinion gears 158 and 158a, as seen in FIG. 11, are mounted to axle 160 and cooperate with rack gears 156 and 156a. When pneumatic cylinder 150 is activated to an extended position rotation of axle 160 is achieved. Rotation of axle 160 results in rotation of pinion gears 158 and 158a thereby moving rack gears 156 and 156a towards conveyor belt 166. Since rack gears 156 and 156a are associated to dividers 170 they also will move towards conveyor belt 166 and assume their position over the belt.

One of the profound advantages of the unloader-unscrambler of this invention is that its manpower requirements are quite low. Generally speaking, one operator can manage and oversee two or three of these apparatuses. Furthermore, setting the apparatus up to receive the type of container to be unloaded and unscrambled is the paragon of simplicity. The operator need only adjust the height of gate 44 at hopper exit throat 12 so that only one layer of containers will pass under the gate. As described previously, this height adjustment is easily achieved by loosening of the vertical adjustment knobs 48 and 48a until the correct height is found and then tightening the same knobs to maintain the correct height. Measuring for the height is accomplished by simply placing a container on the scalloped track and then adjusting the gate height to achieve the function described for hopper exit throad 12. Adjustment of the height of escapement bar 74 at third station 16 is achieved by loosening vertical adjustment knobs, lowering the stand arms within stands 76 and 76a until escapement bar 74 makes contact with the containers when the bar is in the closed position. The height of fingers 92 which are found at third station 16 must be adjusted so that the container will pass underneath the fingers when the fingers are in the open position. This adjustment is accomplished by placing the container in the scalloped track and observing the height of the fingers when in the open position. At flip-over station 20 divider plates 96 are adjusted by turning hand wheel 102 so that the container will have minimal transverse movement as it travels on conveyor belt 104. The distance between dividers 170 at removal station 22 are adjusted by turning hand wheel 172 so that the dividers are spaced apart a distance which insures maximum stability for the container as it drops onto conveyor belt 166.

The vibrators 38, 38a, 38b and 38c are each independently adjustable. Each of the vibrators should be adjusted to achieve the desired movement of the containers to insure that the various stations operate properly on the container and to insure that a flow rate of containers through apparatus 10 is at an optimum level. Obviously one would not want a low feed rate nor a rate so large as to cause jamming of the apparatus. All these adjustments to the vibrators are performed by trial and error and observation of the containers as they move down the track.

In operation, the operator need only place hopper 31 so that the containers will be in contact with vibrator plate 38 when the sliding door is removed to open the bottom of hopper 31. As mentioned previously, vibrator 38 is used to prevent jamming of the container flow from the hopper to apparatus 10. The containers will move to hopper exit throat 12 wherein only one layer of containers will exit the throat and proceed on to second station 14. At second station 14 the containers will all be oriented so that their long axis will lay in the direction of container travel. At the third station, containers which are hooked together at their necks are separated and the overall container flow is halted. When escapement bar 74 is in the open position the containers move on to fourth station 18. During the time that third station 16 is in an open mode, fourth station 18 will be in a closed mode and vice versa. When fourth station 18 is opened, the containers travel on conveyor belt 104 through flip-over station 20 which operates on the containers to insure that all containers will have their bottoms facing the direction of container travel. As the containers leave flip-over station 20 they fall onto conveyor belt 166. Stability is insured by the dividers found at removal station 22 as the containers fall onto conveyor belt 166. Control of the vibrators and timing of the open and closed modes of the third and fourth station is achieved by the utilization of conventional electrical controls. These controls may be conveniently housed in control box 36 as seen in FIG. 1.

What is claimed:

1. A multistation apparatus for unloading and unscrambling containers from a storage hopper, said apparatus comprising:
   a. unloading means for continuously moving said containers from said hopper onto at least one track means, said track means being powered to move the unloaded containers to the apparatus stations;
   b. a first station having a gate means positioned with respect to said track means so that said gate will permit only one layer of unloaded containers to travel onto subsequent apparatus stations;
   c. a second station having orientation means, which orientation means includes spaced apart first and second contact means, said first contact means having a contact portion closer to said first station than the contact portion of said second contact means, whereby a container having its long axis substantially misaligned with the direction of container travel will contact said first contact means contact portion prior to contacting said second contact means contact portion thereby, in conjunction with the movement of said powered track means, causing the misaligned container to move so that its axis is more in alignment with the direction of said container travel;
   d. a third station having a gate means which has a closed position and an opened position, said third station gate, when in the closed position, intermittently halting the travel of containers at said third station and, said third station gate, when it moves from said opened position to said closed position, striking containers which are hooked together at their necks or which are stacked on top of one another to effect separation thereof;
   e. a fourth station having a gate means which has an opened and closed position, said fourth station intermittently halting the travel of containers at said fourth station; and
   f. a fifth station having flip-over means for reversing containers, at said fifth station, which are traveling with their bottoms facing in a direction opposite the direction of travel.

2. The apparatus of claim 1 wherein there is additionally provided, subsequent to said fifth station, an unloading conveyor belt onto which said containers are dropped bottom first from said fifth station.

3. The apparatus of claim 1 wherein said track means comprises:
   a. a scalloped path powered by a series of vibrating tables, said path extending from said unloading means to a point between said third station and said fourth station; and
   b. a track conveyor belt extending from the end of said path to a point past said fifth station.

4. The apparatus of claim 1 wherein the surface of said track conveyor belt is rubberized.

5. The apparatus of claim 1 wherein said series of vibrating tables include:
   a. a first vibrating table extending from said unloading means up to a point adjacent to said first station;
   b. a second vibrating table abutting said first vibrating table at the latter's furtherest downstream extent and extending to a point adjacent said second station; and
   c. a third vibrating table abutting said second vibrating table at the latter's furtherest downstream extent and extending through said third station to a point short of said fourth station.

6. The apparatus of claim 1 wherein said unloading means includes at least one planar surface powered by a vibrating table, said surface being positioned under an opening in the bottom of said hopper and in abutment with said track means.

7. The apparatus of claim 1 wherein said first station gate means includes a barrier extending across said track means substantially perpendicular to the direction of container travel, said barrier being held by mounting means at a height above said track means slightly higher than the height of a container laying on said track means.

8. The apparatus of claim 1 wherein said orientation means includes spaced-apart first and secod contact means, said first and second contact means each having an elongated inclined edge, said edges being adjacent said track means and parallel to each other and to the direction of said container travel, and said first contact means edge having its lowermost extent closer to said first station than the lowermost extent of said second contact means edge.

9. The apparatus of claim 1 wherein said third station gate means comprises a bar being upwardly and downwardly movable to achieve said opened and closed positions, said upward and downward movement being along an inclined path with the travel of said bar being towards said second station as it moves in a downward direction, and said bar being mounted above said track means at a height such that
   i. said bar, in said closed position, contacts said containers at said third station to halt the travel of such containers, and
   ii. said bar, in said open position, is above said containers as they move to said fourth station.

10. The apparatus of claim 1 wherein said fourth station gate means is moved to the open position when said third station gate means is moved to the closed position and wherein said fourth station gate means is moved to the closed position when said third station gate means is moved to the open position.

11. The apparatus of claim 1 wherein said flip-over means comprises means for engaging, by their neck, those containers with their bottoms opposite the direction of container travel, said engaging means being rotatably mounted so that said engaged container neck is lifted off of said track conveyor belt as the rest of said engaged container continues to move on said track conveyor belt, said engagement persisting until said container bottom has passed under said engaged container neck and said engaged container is flipped over.

12. The apparatus of claim 1 wherein there is additionally provided, between said second station and said fourth station, a pair of parallel divider plates on each side of said track means.

13. A multistation apparatus for unloading and unscrambling containers from a storage hopper, said apparatus comprising:
   a. unloading means for continuously moving said containers from said hopper onto at least one track means, said track means being powered to move the unloaded containers to the apparatus stations and said track means having
      (i) a scalloped path powered by a series of vibrating tables, said path extending from said unloading means to a point between a third station and a fourth station; and
      (ii) a track conveyor belt extending from the end of said path to a point past said fifth station;

b. a first station having a gate means positioned with respect to said track means so that said gate will permit only one layer of unloaded containers to travel onto subsequent apparatus stations;

c. a second station having orientation means associated with said track means so that a container on said track means which does not have its long axis substantially in alignment with the direction of container travel will contact said orientation means and thereby be oriented so that its long axis will be more in alignment with the direction of said container travel;

d. said third station having a gate means which has a closed position and an opened position, said third station gate, when in the closed position, intermittently halting the travel of containers at said third station and, said third station gate, when it moves from said opened position to said closed position, striking containers which are hooked together at their necks or which are stacked on top of one another to effect separation thereof;

e. said fourth station having a gate means which has an opened and closed position, said fourth station intermittently halting the travel of containers at said fourth station; and f. a fifth station having flip-over means for reversing containers, at said fifth station, which are traveling with their bottoms facing in a direction opposite the direction of said container travel.

14. The apparatus of claim 13 wherein there is additionally provided, subsequent to said fifth station, an unloading conveyor belt onto which said containers are dropped bottom first from said fifth station.

15. The apparatus of claim 14 wherein the surface of said track conveyor belt is rubberized.

16. The apparatus of claim 14 wherein said series of vibrating tables include:
a. a first vibrating table extending from said unloading means up to a point adjacent to said first station;
b. a second vibrating table abutting said first vibrating table at the latter's furtherest downstream extent and extending to a point adjacent said second station; and
c. a third vibrating table abutting said second vibrating table at the latter's furtherest downstream extent and extending through said third station to a point short of said fourth station.

17. The apparatus of claim 13 wherein said unloading means includes at least one planar surface powered by a vibrating table, said surface being positioned under an opening in the bottom of said hopper and in abutment with said track means.

18. The apparatus of claim 13 wherein said first station gate means includes a barrier extending across said track means substantially perpendicular to the direction of container travel, said barrier being held by mounting means at a height above said track means slightly higher than the height of a container laying on said track means.

19. The apparatus of claim 13 wherein said orientation means includes spaced-apart first and second contact means, said first and second contact means each having an elongated inclined edge, said edges being adjacent said track means and parallel to each other and to the direction of said container travel, and said first contact means edge having its lowermost extent closer to said first station than the lowermost extent of said second contact means edge.

20. The apparatus of claim 13 wherein said third station gate means comprises a bar being upwardly and downwardly movable to achieve said opened and closed positions, said upward and downward movement being along an inclined path with the travel of said bar being towards said second station as it moves in a downward direction, and said bar being mounted above said track means at a height such that:
(i) said bar, in said closed position, contacts said containers at said third station to halt the travel of such containers, and
(ii) said bar, in said open position, is above said containers as they move to said fourth station.

21. The apparatus of claim 13 wherein said fourth station gate means is moved to the open position when said third station gate means is moved to the closed position and wherein said fourth station gate means is moved to the closed position when said third station gate means is moved to the open position.

22. The apparatus of claim 13 wherein said flip-over means comprises means for engaging, by their neck, those containers with their bottoms opposite the direction of container travel, said engaging means being rotatably mounted so that said engaged container neck is lifted off of said track conveyor belt as the rest of said engaged container continues to move on said track conveyor belt, said engagement persisting until said container bottom has passed under said engaged container neck and said engaged container is flipped over.

23. The apparatus of claim 13 wherein there is additionally provided, between said second station and said fourth station, a pair of parallel divider plates on each side of said track means.

* * * * *